T. E. BROWN & C. T. WESTLIN.
MACHINE FOR USE IN GATHERING COTTON.
APPLICATION FILED MAR. 12, 1914.
1,103,653.
Patented July 14, 1914.
3 SHEETS—SHEET 1.
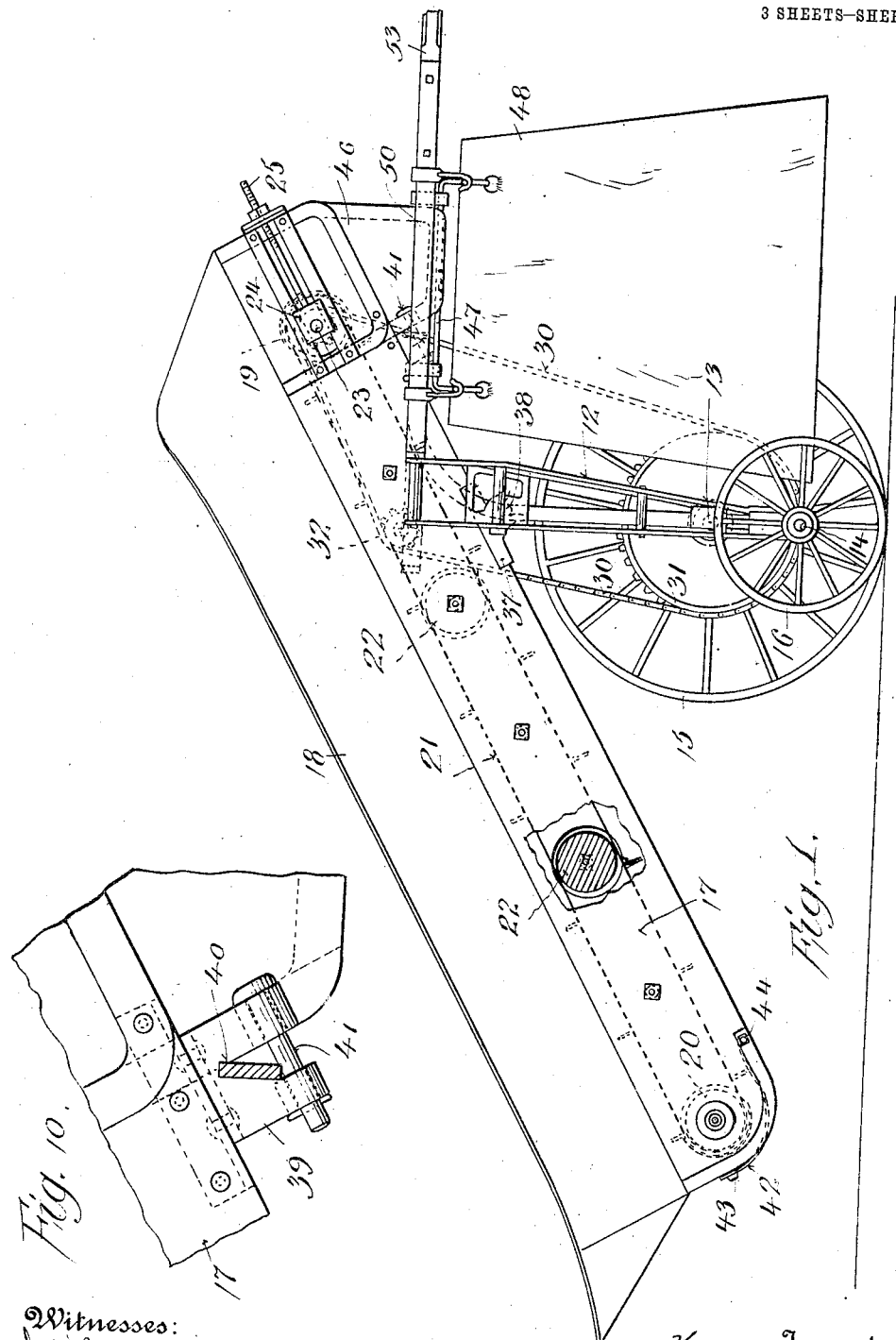

T. E. BROWN & C. T. WESTLIN.
MACHINE FOR USE IN GATHERING COTTON.
APPLICATION FILED MAR. 12, 1914.
1,103,653.
Patented July 14, 1914.
3 SHEETS—SHEET 2.
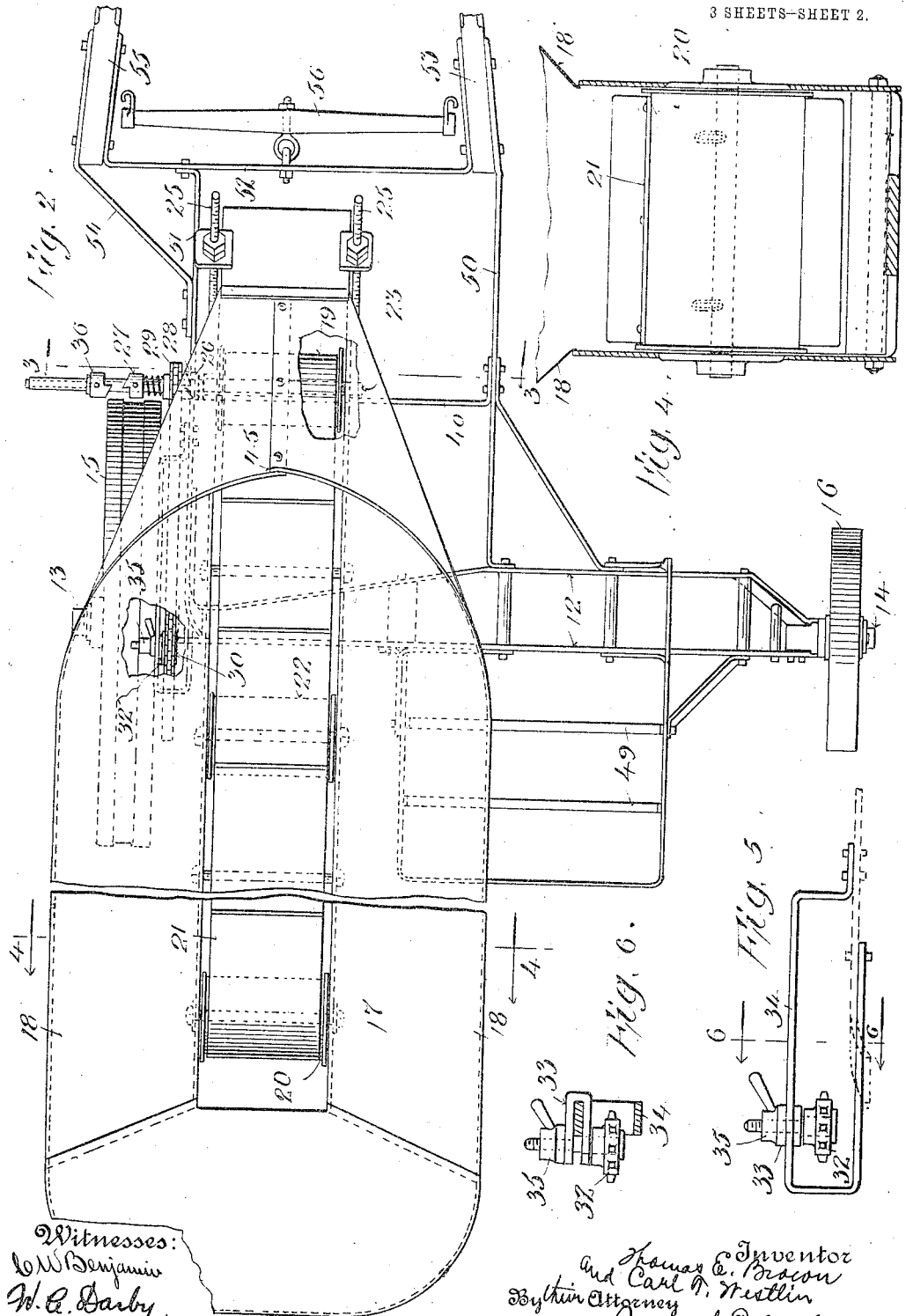

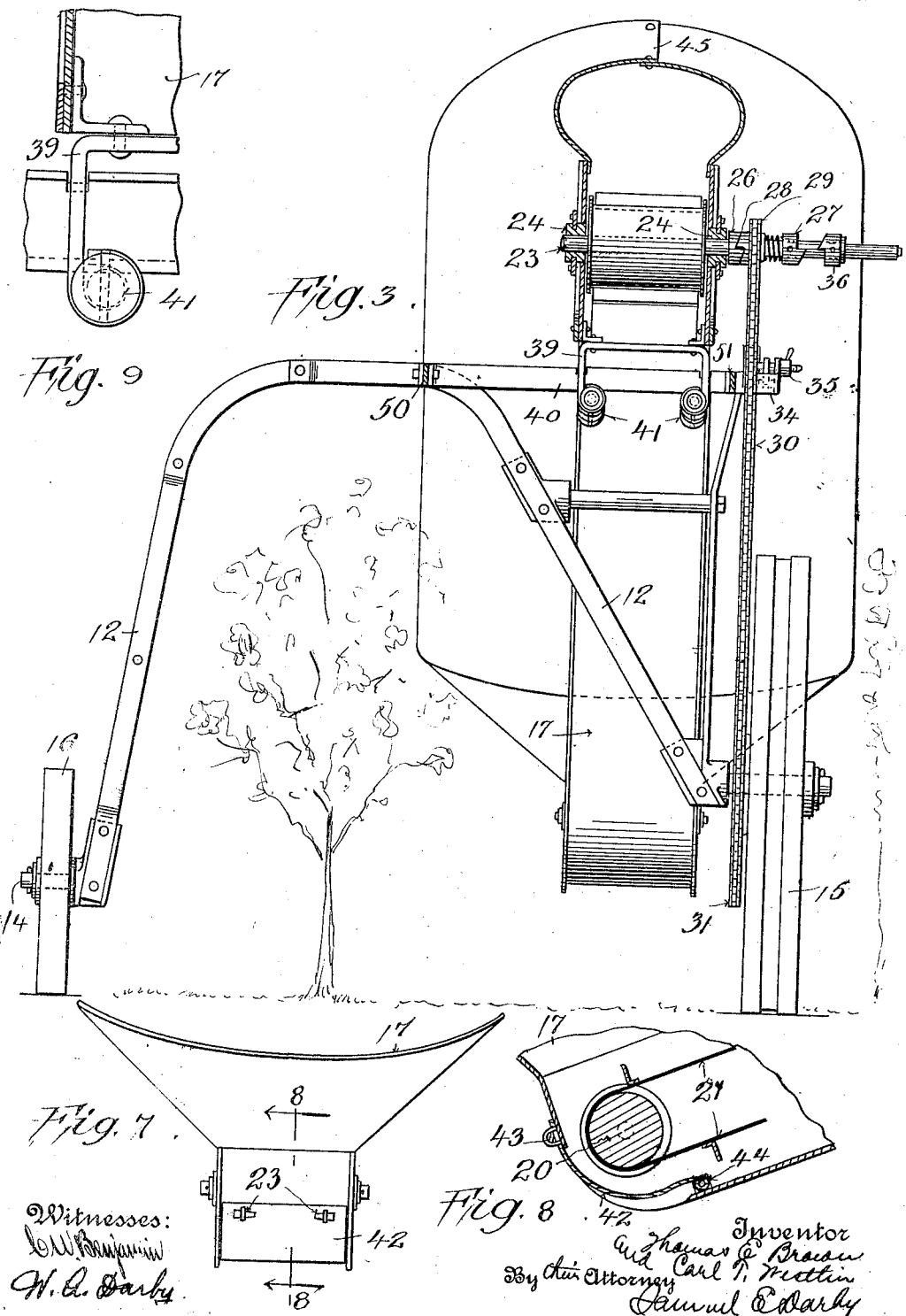

UNITED STATES PATENT OFFICE.

THOMAS E. BROWN, OF NEW YORK, N. Y., AND CARL T. WESTLIN, OF ARLINGTON, NEW JERSEY, ASSIGNORS TO COTTON MACHINERY COMPANY, OF NEW YORK, N. Y., A CORPORATION OF NEW YORK.

MACHINE FOR USE IN GATHERING COTTON.

1,103,653.

Specification of Letters Patent.  Patented July 14, 1914.

Application filed March 12, 1914.  Serial No. 824,331.

*To all whom it may concern:*

Be it known that we, THOMAS E. BROWN, a citizen of the United States, residing at New York, in the county and State of New York, and CARL T. WESTLIN, a subject of the King of Sweden, residing at Arlington, in the county of Hudson, State of New Jersey, have made a certain new and useful invention in Machines for Use in Gathering Cotton, of which the following is a specification.

This invention relates to machines for use in gathering cotton, and particularly to machines of this class wherein a receptacle is employed into which the cotton as picked or gathered by the hands of the laborers is thrown and in which receptacle operates a conveyer for delivering the picked or gathered cotton into suitable bags, baskets or the like.

The object of the invention is to provide a machine of the nature referred to which is simple in construction, economical to manufacture, and efficient in operation.

A further object is to provide a machine of the nature referred to which is strong and durable but light in weight and easily handled or operated.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings, Figure 1 is a view in side elevation of a machine embodying the principles of our invention, a part of the side of the receptacle being broken out and a guide roller for the conveyer being in transverse section. Fig. 2 is a top plan view, parts being broken out to show more clearly the arrangements of certain details. Fig. 3 is a view in front end elevation, parts in vertical transverse section on the line 3, 3, Fig. 2, looking in the direction of the arrows. Fig. 4 is a broken view in transverse section on the line 4, 4, Fig. 3, looking in the direction of the arrows. Fig. 5 is a detail view in top plan showing the arrangement of the sprocket chain tightening guide roller. Fig. 6 is a view in transverse section, on the line 6, 6, Fig. 5, looking in the direction of the arrows. Fig. 7 is a broken view in elevation of the rear end of the receptacle. Fig. 8 is a broken detail view in section on the line 8, 8, Fig. 7, looking in the direction of the arrows. Fig. 9 is a broken detail view in part elevation, parts in transverse section, showing means to support the receptacle at its upper end. Fig. 10 is a similar view in side elevation of the construction shown in Fig. 9.

The same part is designated by the same reference sign wherever it occurs throughout the several views.

In a machine for use in gathering cotton wherein a trailing inclined receptacle is employed which is open at its top for at least the greater portion of its length, and in which operates a conveyer, it is desirable that the weight of the machine be reduced to a minimum without sacrificing anything of strength, in order to facilitate the handling of the machine in the various conditions of cotton fields ordinarily encountered in cotton growing sections. It is also desirable to simplify the construction of such machines in the details thereof in order to enable the same to be handled and operated by the soft earth which is frequently encountered in the space between cotton rows, thereby making it difficult to handle and manage such machines. Moreover in such machines the upper part of the open top inclined receptacle is not readily accessible to the cotton picking laborers by reason of the fact that the large side supporting wheels prevent ready access thereto and sufficient space is not available between the wheels and the receptacle to accommodate such laborers adjacent the upper part of the receptacle. In order to overcome these objections we provide a construction wherein the supporting frame and wheels 15, 16, straddle only one row of stalks, and we arrange the inclined receptacle to trail between the straddled row and the row adjacent thereto, and preferably positioned at one side of the frame and in proximate relation to the plane of operation of the large driving wheel 15, as clearly shown in the drawings. With this arrangement, and employing a small supporting wheel for the opposite side of the frame, we are able to secure ready access of the cotton picking laborers to the inclined receptacle at substantially the full available length of the receptacle, and the laborers are enabled to operate in close relation to the frame and wheels and to the upper part of the receptacle without being impeded in securing ready access to the receptacle by reason of the interposition of the wheels.

Another and valuable feature of our invention embodied in the construction and arrangement above described, lies in the fact that in former proposed machines of this class it was necessary or desirable to adjust the width of the machine to accommodate varying widths of spaces between cotton rows, and where at least two rows had to be spanned the necessity for such adjustment of the transverse width of the machine is increased. Where, however, only one row is spanned by the machine the necessity for such adjustment is avoided.

Reference numeral 17 designates the receptacle. This receptacle is supported at its upper forward end upon the raised or arched portion of the frame and trails rearwardly therefrom in downwardly inclined relation toward the ground. It is provided with outwardly inclined or flaring sides 18, and is open at its top for at least the greater portion of its length. At its upper and lower ends it is provided with transverse rollers 19, 20, upon which operates an endless conveyer 21, forming a movable bottom for the receptacle, the upper leg or run of the conveyer moving toward the upper end of the receptacle in the operation of the machine. If desired, and in order to render the operation of the conveyer easy, the receptacle 17 may be provided with transversely extending idler rolls 22, over which said conveyer operates. The roller 19 at the upper end of the receptacle is provided with a shaft 23, which is journaled in boxes 24, which may be adjusted by adjusting screw rods 25 in order to properly adjust the tension of the conveyer. Pinned to the shaft 23, are the clutch jaws 26, 27. With the clutch jaw 26, coöperates a clutch jaw 28, which is loosely mounted on the roll shaft 23, and is connected to a gear 29, by which the conveyer is actuated. The gear 29, may be driven by any suitable or convenient arrangement of gearing. We have shown a simple arrangement for the purpose, wherein a sprocket chain 30, operates over gear 29 and also over a driving gear 31, connected to the large drive and supporting wheel 15. In order to maintain the sprocket chain 30 taut, we provide an adjustable idler 32, over which said chain operates. This idler is carried by a U-shaped member 33, see Figs. 5 and 6, which embraces a strap brace or bracket 34 secured to the frame struts 12. A clamp nut 35 serves to clamp the member in any desired position of adjustment.

From the foregoing description it will be seen that as the machine progresses through the field or along a row of cotton stalks the rotation of the supporting wheel 15 will drive the conveyer 21. The relative sizes of gears 31 and 29 may be so chosen as to secure any desired speed of operation of the conveyer.

It may sometimes be desirable to operate the conveyer while the machine is standing still. To permit this the clutch jaw 27, with which coöperates the clutch jaw 36, is provided, the jaw 36 being loosely mounted on the roll shaft 23, and adapted in a well known manner to receive a crank handle socket or other convenient device, and to be shifted along shaft 23 into engaging relation with respect to the clutch jaw 27. By this means the conveyer 21 may be operated by hand independently of the drive gearing therefor.

In order to efficiently support the inclined receptacle, we provide the same on its under side with a forked seat bracket 37, designed to engage loosely over a transversely extending frame member 38, see Fig. 1, said frame member forming a fulcrum support for the seat bracket, and the receptacle should be so positioned as to be supported at this point with fairly equal balance in order that the weight thereof may be taken directly upon the supporting wheels and to relieve other portions of the frame of undue strain. At the same time a desirable flexibility should be secured in order to provide against undue strain due to oscillations by reason of the machine passing over rough or uneven ground, stones or the like. The free seating of the forked seat bracket upon the transverse frame member enables this result to be secured, and in coöperation therewith we provide means to detachably and movably engage the receptacle and machine frame at a point nearer the upper end of the receptacle. The form of means shown comprises a bracket 39, secured to the bottom of the receptacle which engages over a transverse frame member 40. Suitably cottered pins 41, serve to detachably lock the brackets 39 to the frame member 40 with a sufficient range of free movement to prevent undue strains.

It may sometimes be desirable to gain access to the lower end of the receptacle in order to clear out or remove any dirt, sticks or other foreign material that may collect in the receptacle, and gravitate to the lower end. To permit this we provide the lower end of the receptacle with a door 42, see Figs. 7 and 8, which is hinged at one edge as at 44, to the bottom of the receptacle, and detachably secured at its other edge, as at 43, to the end wall of the receptacle.

At its upper end the receptacle is provided with a delivery mouth or opening through which the cotton deposited in the receptacle is delivered by the conveyer. This mouth or delivery opening may be formed in any suitable or convenient manner. A simple and efficient arrangement is shown wherein the side walls of the receptacle are curved over toward and lapped upon each other, as indicated at 45, Figs. 2 and 3, thereby forming a funnel shaped delivery mouth or opening. If desired the material forming the sides of the receptacle, and lapped over upon each other, as described, may be extended downwardly from the throat of the delivery end of the receptacle to form a short section of downwardly extending chute indicated at 46, Fig. 1. Positioned below the delivery mouth of the receptacle is a support 47 for a bag, basket or other convenient device, indicated at 48, to receive the gathered cotton delivered from the carrier 21. If desired, and in order to carry a supply of empty bags, we provide a rack frame 49, and suitably support the same on the frame struts 12, as shown in Fig. 2.

The machine may be progressed through the field and along the rows of cotton stalks in any suitable or convenient manner. We have shown draft appliances connected to the frame for attachment of a mule or horse to draw the machine along. In the form shown, forwardly extending and suitably braced arms 50, 51, are secured to the raised or arched portion of the frame 12. To the forward end of arm 51, is connected a transversely extending member 52 which, at one end, coöperates with the front end of arm 50, to receive and secure the draft shaft 53. The other end of member 52, coöperates with a bracket 54, which is secured to arm 51, to receive and secure the coöperating shaft 55. A swingletree 56, positioned between the shafts 53, 55, is connected to the member 52.

It will be evident that many other constructions and arrangements of draft appliances may be employed without departure from the spirit and scope of our invention. The form shown, however, is simple and efficient. It will also be evident that many other changes and variations in details of construction and arrangement might readily occur to persons skilled in the art and still fall within the spirit and scope of our invention. But Having now set forth the object and nature of our invention, and a construction embodying the principles of our invention, what we claim as new and useful, and of our own invention, and desire to secure by Letters Patent of the United States, is—

1. In a machine for use in gathering cotton, a frame raised or arched intermediate its ends, a supporting wheel at each end of said frame, said wheels being spaced apart from each other a distance sufficient to straddle a single row of cotton stalks, and a receptacle open at its top and supported upon the raised or arched portion of said frame and extending downwardly and rearwardly therefrom, and positioned at one side of the machine in approximately the plane of one of the supporting wheels to operate at the side of the straddled row of cotton stalks, and a carrier operating in said receptacle.

2. In a machine for use in gathering cotton, a frame raised or arched intermediate its ends and supported upon side wheels at its ends, one of said wheels being of smaller diameter than the other, a receptacle open at its top supported at its forward end upon the raised or arched portion of the frame and inclined downwardly and rearwardly therefrom, and positioned adjacent the plane of operation of the wheel of larger diameter.

3. In a machine for use in gathering cotton, a frame raised or arched intermediate its ends and supported at its ends upon wheels, and including a transversely extending member, a receptacle having a seat bracket upon its bottom side, said bracket engaged loosely over said transversely extending member, said receptacle extending rearwardly and downwardly from said frame, means for detachably engaging said receptacle and frame near the forward end of the former, and a carrier operating in said receptacle.

4. In a machine for use in gathering cotton, a frame raised or arched intermediate its ends upon wheels, said frame having transversely extending members, a receptacle having a forked seat bracket and a locking bracket secured to the under side of the same, said locking bracket being located near the forward end of said receptacle, and detachably secured to one of said frame members, said seat bracket being loosely seated on the other of said frame members to carry the weight of said receptacle, said receptacle being open at its top and inclined rearwardly and downwardly from the raised or arched portion of the frame, and a carrier operating in said receptacle.

5. In a machine for use in gathering cotton, a frame raised or arched intermediate its ends, supporting wheels for the ends of said frame, a receptacle supported upon the raised part of said frame and inclined downwardly and rearwardly therefrom, said receptacle open at its top, a carrier operating in said receptacle, a drive gearing for said carrier including a double clutch mechanism, power operated mechanism for operating one member of the double clutch, manually operated mechanism for operating another member of the double clutch, and an adjustable idler for the power operated mechanism.

6. In a machine for use in gathering cotton, a frame raised or arched between its ends, supporting wheels for the ends of said frame, a receptacle supported at its forward end upon the raised portion of the frame and inclined downwardly and rearwardly therefrom, said receptacle having outwardly flaring sides, said sides being curved over toward and lapped upon each other at their forward upper ends to form a delivery mouth or throat for the receptacle, and a carrier operating in said receptacle and delivering to said mouth or throat.

7. In a machine for use in gathering cotton, a frame raised or arched intermediate its ends, supporting wheels for the ends of said frame, a receptacle open at its top and supported at its forward end upon the raised portion of said frame, said receptacle being inclined rearwardly and downwardly from said frame, a carrier operating in said receptacle, a drive chain for said carrier, a drive gear connected to one of said wheels for driving said chain, a frame bracket, a clamp frame adjustably mounted on said brackets, and an idler wheel carried by said clamp frame, said drive chain operating over said idler wheel.

In testimony whereof we have hereunto set our hands in the presence of the subscribing witnesses, on this 9th day of March A. D., 1914.

THOMAS E. BROWN.
CARL T. WESTLIN.

Witnesses:
SAMUEL E. DARBY, Jr.,
CLINTON B. BROWN.